(12) United States Patent
Nammi et al.

(10) Patent No.: US 10,368,304 B2
(45) Date of Patent: Jul. 30, 2019

(54) ENCODING AND DECODING DATA FOR GROUP COMMON CONTROL CHANNELS

(71) Applicant: AT&T Intellectual Property I, L.P., Atlanta, GA (US)

(72) Inventors: SaiRamesh Nammi, Austin, TX (US); Arunabha Ghosh, Austin, TX (US); Salam Akoum, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 16/007,005

(22) Filed: Jun. 13, 2018

(65) Prior Publication Data

US 2018/0295571 A1    Oct. 11, 2018

Related U.S. Application Data

(62) Division of application No. 15/467,591, filed on Mar. 23, 2017, now Pat. No. 10,028,210.

(51) Int. Cl.
*H04W 4/00* (2018.01)
*H04W 48/16* (2009.01)
(Continued)

(52) U.S. Cl.
CPC ........... *H04W 48/16* (2013.01); *H04L 1/0045* (2013.01); *H04L 1/0072* (2013.01);
(Continued)

(58) Field of Classification Search
CPC . H04W 48/16; H04W 72/121; H04W 72/042; H04W 28/06; H04W 36/0077;
(Continued)

(56) References Cited

U.S. PATENT DOCUMENTS 7,886,142 B2   2/2011   Kwon et al.
8,458,559 B2   6/2013   Siew et al.
(Continued)

FOREIGN PATENT DOCUMENTS

WO    2010075710 A1    7/2010

OTHER PUBLICATIONS

Miloš, "Models of Control Channels in The LTE System.," Brno University of Technology, 2014, 39 pages.
(Continued)

*Primary Examiner* — Nathan S Taylor
(74) *Attorney, Agent, or Firm* — Amin, Turocy & Watson, LLP

(57) ABSTRACT

An improved technique for encoding and decoding of data for group common control channels is provided herein. Generally, the embodiments disclosed herein involve masking the information bits of the group common PDCCH (or group common control channel information) with the common RNTI, without using parity bits, which reduces the power requirements of the transmitter and receiver. In a first embodiment, the information block and the common RNTI can each be encoded using separate encoders, and then the encoded information block can be masked with the encoded common RNTI, and the resulting code symbol can be transmitted to the group of mobile devices. In a second embodiment, an information block can be appended with bits to match a size of the common RNTI, and then be masked by the common RNTI.

20 Claims, 13 Drawing Sheets

(51) Int. Cl.
*H04W 72/12* (2009.01)
*H04L 1/00* (2006.01)
*H04L 25/06* (2006.01)

(52) U.S. Cl.
CPC ........ *H04W 72/121* (2013.01); *H04L 25/067* (2013.01); *Y02D 70/00* (2018.01); *Y02D 70/10* (2018.01); *Y02D 70/12* (2018.01); *Y02D 70/1224* (2018.01); *Y02D 70/1242* (2018.01); *Y02D 70/1262* (2018.01); *Y02D 70/142* (2018.01); *Y02D 70/144* (2018.01); *Y02D 70/146* (2018.01); *Y02D 70/162* (2018.01); *Y02D 70/21* (2018.01); *Y02D 70/23* (2018.01); *Y02D 70/26* (2018.01)

(58) Field of Classification Search
CPC ....... H04W 4/06; H04W 4/70; H04W 72/048; H04W 8/26; H04L 25/067; H04L 5/0055; H04L 1/0026; H04L 1/0027; H04L 1/06; H04L 1/1671; H04L 1/1812; H04L 1/1822; H04L 1/1854; H04L 1/1861; H04L 1/1896; H04L 5/001; H04L 5/0053
USPC ...................... 455/450, 435.1; 370/312, 329
See application file for complete search history.

(56) References Cited

U.S. PATENT DOCUMENTS

| | | | |
|---|---|---|---|
| 8,488,549 B2 | 7/2013 | Yang et al. | |
| 8,780,930 B2 | 7/2014 | Cheng | |
| 8,824,366 B2 | 9/2014 | Lee et al. | |
| 9,131,491 B2 | 9/2015 | Lee et al. | |
| 9,220,096 B2 | 12/2015 | Chun et al. | |
| 9,338,774 B2 | 5/2016 | Ihm et al. | |
| 9,338,775 B2 | 5/2016 | Yang et al. | |
| 9,363,803 B2 | 6/2016 | Seo et al. | |
| 9,385,838 B2 | 7/2016 | Hwang et al. | |
| 9,402,251 B2 | 7/2016 | Han et al. | |
| 9,450,729 B2 | 9/2016 | Kim et al. | |
| 9,467,990 B2 | 9/2016 | Kim et al. | |
| 9,485,755 B2 | 11/2016 | Tee et al. | |
| 9,485,763 B2 | 11/2016 | You et al. | |
| 9,510,326 B2 | 11/2016 | Lee et al. | |
| 9,516,630 B2 | 12/2016 | Yang et al. | |
| 9,544,107 B2 | 1/2017 | Chun et al. | |
| 9,584,287 B2 | 2/2017 | Seo et al. | |
| 2008/0096557 A1* | 4/2008 | Rinne | H04W 8/26 455/435.1 |
| 2009/0268707 A1* | 10/2009 | Pani | H04L 1/18 370/345 |
| 2011/0103509 A1 | 5/2011 | Chen et al. | |
| 2012/0320826 A1* | 12/2012 | Kim | H04J 13/16 370/328 |
| 2012/0320852 A1* | 12/2012 | Seo | H04L 5/005 370/329 |
| 2012/0320951 A1* | 12/2012 | Han | H04L 1/0041 375/141 |
| 2013/0003639 A1* | 1/2013 | Noh | H04L 5/0053 370/312 |
| 2013/0039284 A1 | 2/2013 | Marinier et al. | |
| 2013/0163551 A1 | 6/2013 | He et al. | |
| 2013/0194931 A1* | 8/2013 | Lee | H04L 5/0053 370/241 |
| 2013/0229906 A1* | 9/2013 | Akkarakaran | H04L 5/0044 370/216 |
| 2013/0286992 A1* | 10/2013 | Hong | H04W 72/0406 370/329 |
| 2013/0287064 A1 | 10/2013 | Seo et al. | |
| 2013/0294547 A1* | 11/2013 | Lane | H04L 1/0036 375/340 |
| 2013/0329652 A1* | 12/2013 | Pani | H04W 72/121 370/329 |
| 2013/0343261 A1* | 12/2013 | Gonsa | H04B 7/2606 370/315 |
| 2014/0003381 A1* | 1/2014 | Lee | H04L 1/0026 370/329 |
| 2014/0226552 A1* | 8/2014 | Niu | H04W 4/06 370/312 |
| 2014/0355493 A1* | 12/2014 | Niu | H04W 76/40 370/280 |
| 2015/0043462 A1 | 2/2015 | Hwang et al. | |
| 2015/0092711 A1* | 4/2015 | Tabet | H04L 1/0042 370/329 |
| 2015/0189627 A1* | 7/2015 | Yang | H04L 5/0098 370/280 |
| 2015/0245350 A1* | 8/2015 | Webb | H04L 5/0007 370/329 |
| 2016/0182187 A1 | 6/2016 | Kim et al. | |
| 2016/0219584 A1 | 7/2016 | Bertrand et al. | |
| 2016/0226643 A1* | 8/2016 | Mallik | H04L 5/0055 |
| 2016/0345117 A1* | 11/2016 | Nguyen | H04W 4/70 |
| 2017/0111896 A1* | 4/2017 | Han | H04L 1/0041 |
| 2017/0111897 A1* | 4/2017 | Kim | H04J 13/16 |
| 2017/0134126 A1* | 5/2017 | Sanderovich | H04L 5/0044 |
| 2017/0135116 A1* | 5/2017 | Kuchibhotla | H04L 43/087 |
| 2017/0171865 A1* | 6/2017 | Hwang | H04B 1/713 |
| 2017/0223687 A1* | 8/2017 | Kuchibhotla | H04W 72/044 |

OTHER PUBLICATIONS

Peñuelas, "Distributed cooperative MIMO in beyond 2020 wireless networks.," Universitat Politecnica de Valencia, 2016, 174 pages.
Wu, et al. "Performance analysis of physical downlink and uplink channels in TDLTE system.," Communication Technology (ICCT), 2010 12th IEEE International Conference. IEEE, 2010, 4 pages.
Roth, "Analysis and augmentation of timing advance based Geolocation in LTE Cellular Networks.," Diss. Monterey, California: Naval Postgraduate School, 2016, 174 pages.
Notice of Allowance for U.S. Appl. No. 15/467,591 dated Mar. 12, 2018, 17 pages.

* cited by examiner

US 10,368,304 B2

ENCODING AND DECODING DATA FOR GROUP COMMON CONTROL CHANNELS

RELATED APPLICATION

The subject patent application is a divisional of, and claims priority to, U.S. patent application Ser. No. 15/467,591, filed Mar. 23, 2017, and entitled "ENCODING AND DECODING DATA FOR GROUP COMMON CONTROL CHANNELS," the entirety of which application is hereby incorporated by reference herein.

TECHNICAL FIELD

The present application relates generally to the field of mobile communication and, more specifically, to encoding and decoding data for group common control channels in a next generation network.

BACKGROUND

To meet the huge demand for data centric applications, Third Generation Partnership Project (3GPP) systems and systems that employ one or more aspects of the specifications of the Fourth Generation (4G) standard for wireless communications will be extended to a Fifth Generation (5G) standard for wireless communications. Unique challenges exist to provide levels of service associated with forthcoming 5G and other next generation network standards.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
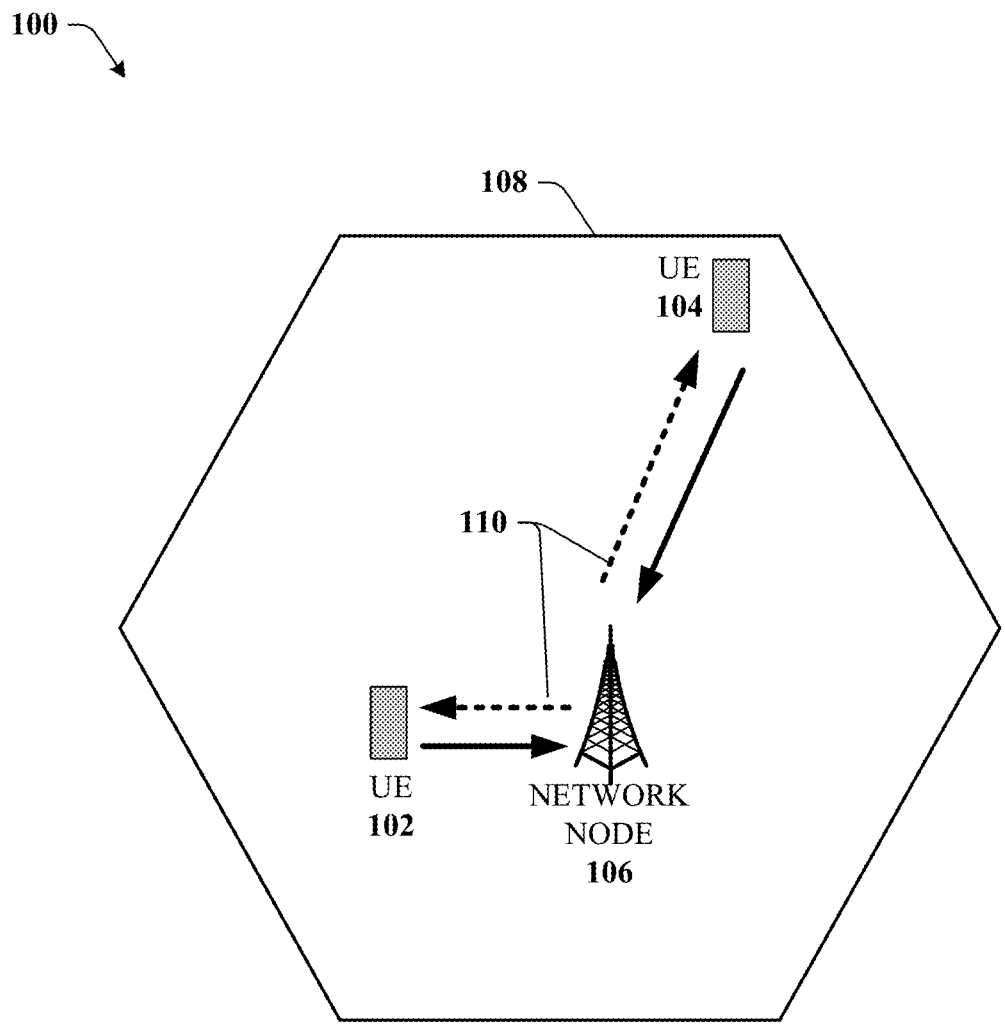
FIG. 1 illustrates an example wireless communication system in accordance with various aspects and embodiments of the subject disclosure.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

In various embodiments, a transmitter device can comprise a processor and a memory that stores executable instructions that, when executed by the processor facilitate performance of operations. The operations can comprise encoding an information block with a first encoder, resulting in an encoded information block. The operations can also comprise encoding a radio network identifier with a second encoder, resulting in an encoded radio network identifier. The operations can also comprise masking the encoded information block with the encoded radio network identifier, resulting in a code symbol. The operations can also comprise transmitting the code symbol to a group of mobile devices on a common control channel.

In another embodiment, a receiver device can comprise a processor and a memory that stores executable instructions that, when executed by the processor facilitate performance of operations. The operations can comprise receiving a code symbol from a base station device on a common control channel. The operations can also comprise unmasking the code symbol with an encoded radio network identifier resulting in an encoded information block. The operations can also comprise decoding the encoded information block to resulting in an information block comprising common control channel downlink information.

In another embodiment a method can comprise appending, by a base station device comprising a processor, bits to an information block to match a size of a radio network identifier, wherein the information block comprises common downlink control information, and wherein the appending results in appended bits. The method can also comprise masking, by the base station device, the information block with the radio network identifier, resulting in a masked information block. The method can also comprise encoding, by the base station device, the masked information block resulting in an code symbol.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

Various embodiments disclosed herein provide for improved encoding and decoding of data for group common control channels. The group common control channel is a channel which is common to a group of mobile devices (UEs) in the cell for assisting the UE in decoding the physical downlink control channel (PDCCH). It contains few number of bits and it generally carries information about the slot structure i.e., where in the OFDMA domain to decode for PDCCH, and information about reference signals or the density for decoding PDCCH, modulation and/or code rate for PDCCH, and channel encoding parameters (for example if PDCCH uses polar code, the polar code parameters such as frozen bit set etc.). Note that these parameters are either sent explicitly or implicitly, which means that these parameters can be defined in the standard, and one index can sent as part of group common PDCCH. The group common PDCCH channel is transmitted before the transmission of PDCCH and is sent to a group of UEs to assist the UEs in decoding the downlink control channel.

Traditional methods for transmitting the group common PDCCH involve computing cyclic redundancy check (CRC) bits for the information bits, attaching the CRC bits to the information bits, scrambling the CRC bits with the radio network temporary identifier (RNTI), and then encoding the resulting bits. The RNTI is a radio network identifier that a base station device can use to identify the cell or type of communication. A single base station device can have different RNTIs depending on the type of transmission, to enable a mobile device to determine what type of transmission is being received (e.g., group common PDCCH, control channel PDCCH, data transfer, etc).

By contrast, the embodiments disclosed herein provide for an improved encoding and decoding scheme for the base station device and mobile device respectively. Generally, the embodiments disclosed herein involve masking the information bits of the group common PDCCH (or group common control channel information) with the common RNTI, without using parity bits, which reduces the power requirements of the transmitter and receiver. In a first encoding embodiment, the information block and the common RNTI can each be encoded using separate encoders, and then the encoded information block can be masked with the encoded common RNTI, and the resulting code symbol can be transmitted to the group of mobile devices. In a second encoding embodiment, an information block can be appended with bits to match a size of the common RNTI, and then be masked by the common RNTI. The resulting bits can then be encoded by an encoder, and transmitted to the group of mobile devices.

In a first decoding embodiment, corresponding to the first encoding embodiment, the common RNTI can be encoded by the receiver device, and then be unmasked with the received data to obtain the encoded information block. The encoded information block can then be decoded by a decoder to obtain the group common PDCCH. In a second decoding embodiment, corresponding to the second encoding embodiment, a received code symbol can be decoded, and the using the common RNTI, the decoded bits can be unmasked to obtain the padded information block. The padded bits can be removed, resulting in the group common PDCCH.

FIG. 1 illustrates an example wireless communication system 100 in accordance with various aspects and embodiments of the subject disclosure. In one or more embodiments, system 100 can comprise one or more user equipment UEs 104 and 102, which can have one or more antenna panels having vertical and horizontal elements. A UE 102 can be a mobile device such as a cellular phone, a smartphone, a tablet computer, a wearable device, a virtual reality (VR) device, a heads-up display (HUD) device, a smart car, a machine-type communication (MTC) device, and the like. User equipment UE 102 can also comprise IOT devices that communicate wirelessly. In various embodiments, system 100 is or comprises a wireless communication network serviced by one or more wireless communication network providers. In example embodiments, a UE 102 can be communicatively coupled to the wireless communication network via a network node 106.

The non-limiting term network node (or radio network node) is used herein to refer to any type of network node serving a UE 102 and UE 104 and/or connected to other network node, network element, or another network node from which the UE 102 or 104 can receive a radio signal. Network nodes can also have multiple antennas for performing various transmission operations (e.g., MIMO operations). A network node can have a cabinet and other protected enclosures, an antenna mast, and actual antennas. Network nodes can serve several cells, also called sectors, depending on the configuration and type of antenna. Examples of network nodes (e.g., network node 106) can comprise but are not limited to: NodeB devices, base station (BS) devices, access point (AP) devices, and radio access network (RAN) devices. The network node 106 can also comprise multi-standard radio (MSR) radio node devices, including but not limited to: an MSR BS, an eNode B, a network controller, a radio network controller (RNC), a base station controller (BSC), a relay, a donor node controlling relay, a base transceiver station (BTS), a transmission point, a transmission node, an RRU, an RRH, nodes in distributed antenna system (DAS), and the like. In 5G terminology, the node 106 can be referred to as a gNodeB device.

In example embodiments, the UE 102 and 104 can send and/or receive communication data via a wireless link to the network node 106. The dashed arrow lines 110 from the network node 106 to the UE 102 and 104 represent downlink (DL) communications and the solid arrow lines from the UE 102 and 104 to the network nodes 106 represents an uplink (UL) communication. Before the downlink control information is sent to each UE 102 and 104, the network node 106 can send group common PDCCH information to both UE 102 and 104 to provide parameters and information for the UE 102 and 104 to receive the individual downlink control information.

Wireless communication system 100 can employ various cellular technologies and modulation schemes to facilitate wireless radio communications between devices (e.g., the UE 102 and 104 and the network node 106). For example, system 100 can operate in accordance with a UMTS, long term evolution (LTE), high speed packet access (HSPA), code division multiple access (CDMA), time division multiple access (TDMA), frequency division multiple access (FDMA), multi-carrier code division multiple access (MC-CDMA), single-carrier code division multiple access (SC-CDMA), single-carrier FDMA (SC-FDMA), OFDM, (DFT)-spread OFDM or SC-FDMA)), FBMC, ZT DFT-s-OFDM, GFDM, UFMC, UW DFT-Spread-OFDM, UW-OFDM, CP-OFDM, resource-block-filtered OFDM, and UFMC. However, various features and functionalities of system 100 are particularly described wherein the devices (e.g., the UEs 102 and 104 and the network device 106) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.).

In various embodiments, system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

Figure 2:
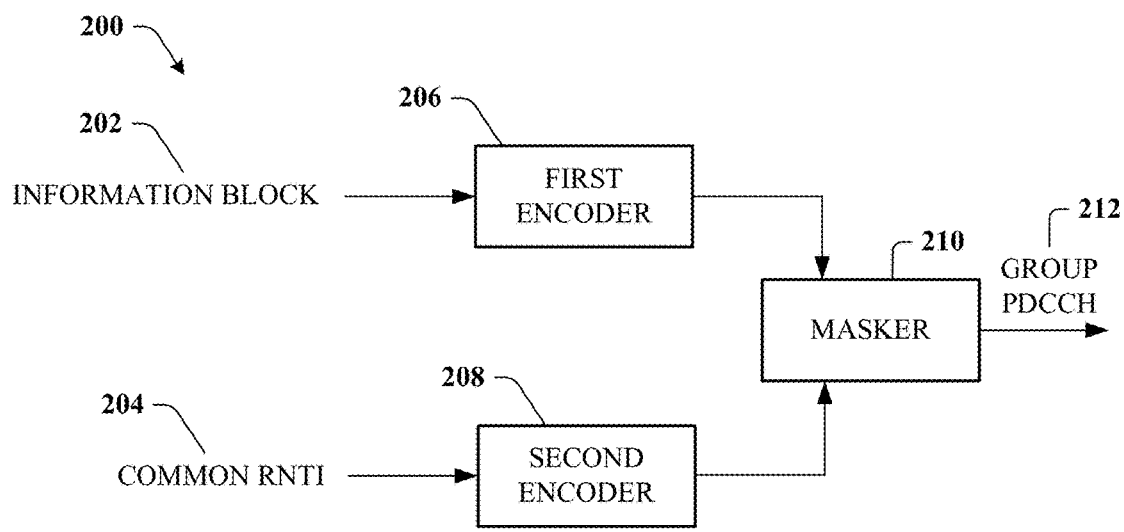
FIG. 2 illustrates an example block diagram of encoding system for group common control channel communications in a wireless environment in accordance with various aspects and embodiments of the subject disclosure.

Turning now to FIG. 2, illustrated is an example block diagram 200 of cross link interference in a wireless environment in accordance with various aspects and embodiments of the subject disclosure.

In an embodiment, a first encoder 206 can receive an information block 202 and encode the information block 202 resulting in an encoded information block. Likewise, a second encoder 208 can receive the common RNTI bits 204 and encode the bits resulting in an encoded RNTI. A masker 210 can mask the encoded information block with the encoded RNTI, resulting in a code symbol of group PDCCH information 212 that can be transmitted to the base station device.

In an embodiment, the first encoder 206 can be a Reed-Muller encoder or a Polar encoder. Similarly, the second encoder 208 could also be one of a Reed-Muller encoder or a Polar encoder. Any combination of either Reed-Muller or Polar encoders can be used for the first encoder 206 and the second encoder 208.

In an embodiment, the information block 202 can be 5 bits, or 8 bits or some number of bits smaller than the common RNTI 204 which is generally 16 bits. Therefore, the code rate of the encoders can be such that the resulting encoded information block is the same size as the encoded RNTI to facilitate the masking. In an embodiment, the information block 202 can be 5 bits, and the first encoder 206 code rate can be 5/20, resulting in an encoded information block of 20 bits. Similarly, the code rate of the second encoder 208 can be 16/20, resulting in a encoded RNTI of 20 bits as well. These code rates are merely exemplary, and in other embodiments, with different sized information blocks and RNTIs, and different encoders, the code rates may be different than these exemplary code rates.

In an embodiment, the masker 210 can be a bitwise exclusive-or (XOR) function. An XOR function is a logical operation that outputs true when the inputs are different. If a portion of the bits of the encoded information block are thus 0,1,0,1 and a corresponding portion of the encoded RNTI bits are 1,1,0,0, masking the encoded information block with the encoded RNTI results in the following bits 1,0,0,1. This can be transmitted to the group of mobile devices, and the mobile devices that have the encoded RNTI bits can then unmask these bits to retrieve the encoded information block.

In an embodiment, the information bits for group common PDCCH encoding can be increased by for example zero padding or to include any additional information that need to be included in the group PDCCH indication, for forward compatibility, up to 16 bits.

In an embodiment, the base station device can transmit to the group of mobile devices the common RNTI on a radio resource control channel before the group common control channel is established.

Figure 3:
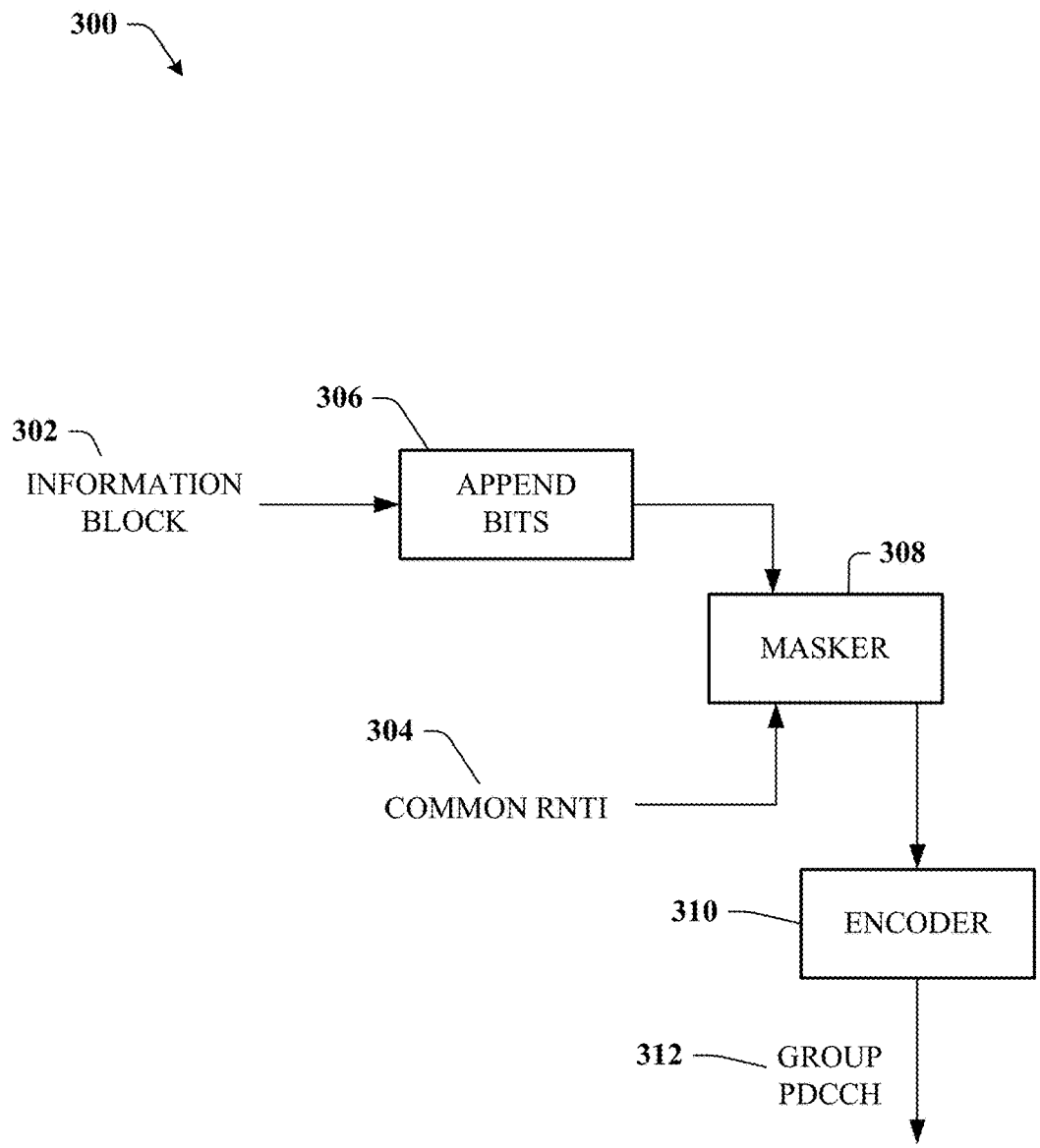
FIG. 3 illustrates an example block diagram of another encoding system for group common control channel communications in a wireless environment in accordance with various aspects and embodiments of the subject disclosure.

Turning now to FIG. 3, illustrated is an example block diagram 300 of another encoding system for group common control channel communications in a wireless environment in accordance with various aspects and embodiments of the subject disclosure.

In the embodiment shown here, an information block 302 can have bits appended to it by a bit appender 306 to match a length of a common RNTI 304. The information block with appended bits can then be masked by a masker 308 with the common RNTI 304, and the resulting masked information block can then be encoded by encoder 310 and transmitted as a group PDCCH on a group common control channel to a group of mobile devices.

In an embodiment, the encoder 310 can be a Reed-Muller encoder or a Polar encoder. The masker 308 can be an exclusive-or (XOR) function. An XOR function is a logical operation that outputs true when the inputs are different. If a portion of the bits of the encoded information block are thus 0,1,0,1 and a corresponding portion of the encoded RNTI bits are 1,1,0,0, masking the encoded information block with the encoded RNTI results in the following bits 1,0,0,1. This can be transmitted to the group of mobile devices, and the mobile devices that have the encoded RNTI bits can then unmask these bits to retrieve the encoded information block.

In an embodiment, the bit appender 306 can determine a length of the common RNTI 304 and add a number of bits to the information block 302 to match the length of the common RNTI 304. In an embodiment, the bit appender can add null bits (0s) to the information block or can repeat the last bit. For example, if the information block 302 is 5 bits, the bit appender 306 can add 11 null bits, or repeat the last bit 11 times until the length of the information block is 16 bits to match the common RNTI 304 length.

Figure 4:
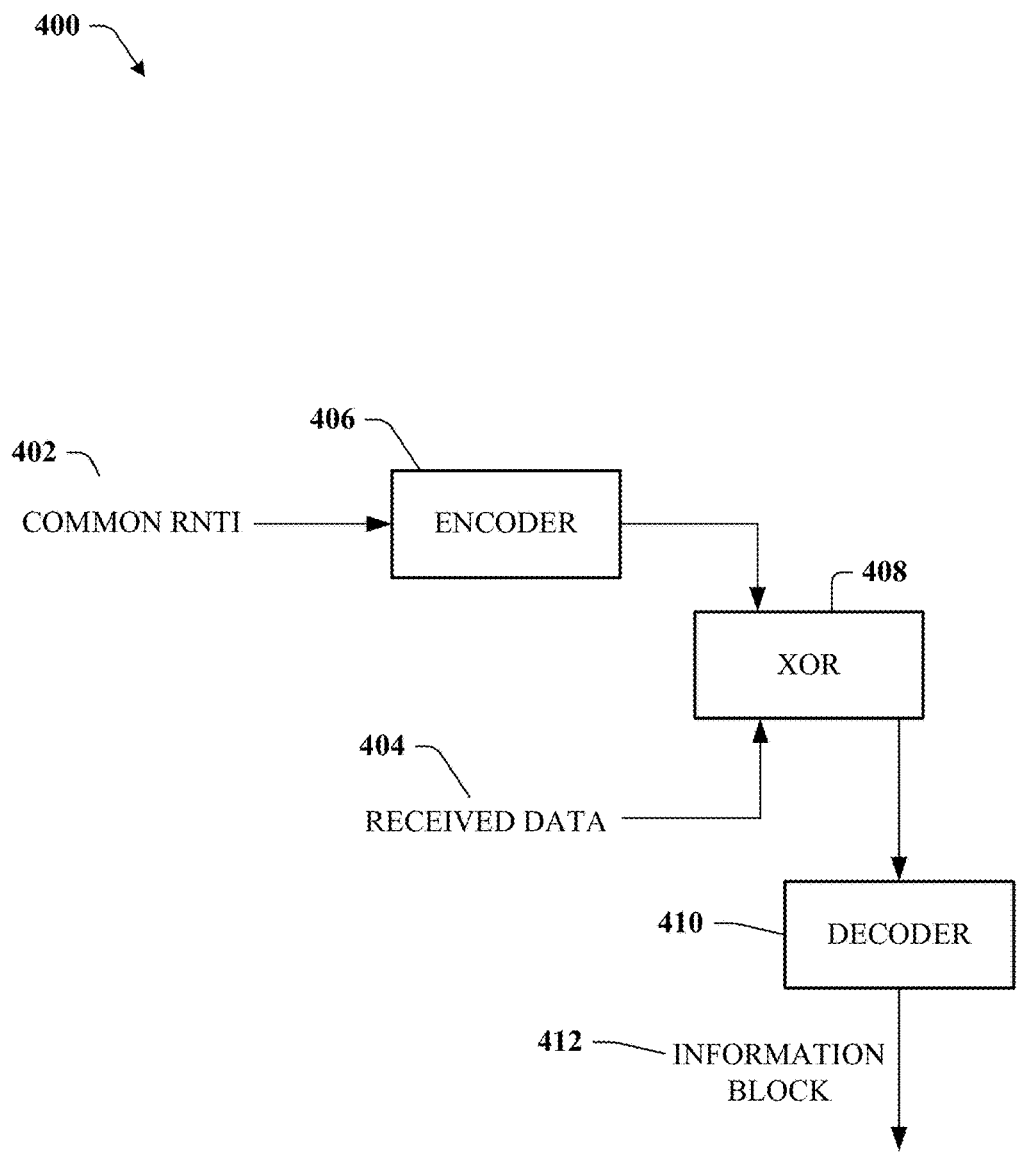
FIG. 4 illustrates an example block diagram of decoding system for group common control channel communications in a wireless environment in accordance with various aspects and embodiments of the subject disclosure.

Turning now to FIG. 4, illustrated is an example block diagram 400 of decoding system for group common control channel communications in a wireless environment in accordance with various aspects and embodiments of the subject disclosure. The embodiment shown in FIG. 4, corresponds to the encoding method shown in FIG. 2. The mobile devices can perform the decoding steps described here when the encoding method in FIG. 2 is the standard for the mobile network. The embodiment shown in FIG. 6, similarly corresponds to the encoding embodiment shown in FIG. 3.

In an embodiment, an encoder 406 can encode the common RNTI 402 and a XOR function 408 can unmask the received data 404 (code symbol) with the encoded RNTI to determine the encoded information block. The decoder 410 can then decode the encoded information block resulting in the information block 412.

The mobile device performing the decoding steps can receive the common RNTI 402 when the mobile device initializes on the cell, or attaches to the cell associated with the base station device. From time to time, the RNTI may change, and the base station device can broadcast the new RNTI to mobile devices in the cell. In an embodiment, the base station device can have a plurality of RNTIs, each having different functions. For instance, the common RNTI 402 used here is the radio network identifier for group common control channels. Other channels can have different RNTIs.

The encoder 406 used to encode the common RNTI 402 can be either a Reed-Muller encoder or a Polar encoder, and should correspond to the encoder used at the base station device to encode the RNTI before masking the encoded information block.

It should be appreciated that the unmasking performed by the bitwise XOR operator 408 essentially repeats the masking performed at the base station device. For instance, as shown above, if the encoded RNTI has bits 1,1,0,0, masking the encoded information block with the encoded RNTI results in the following bits 1,0,0,1. At the receiver, performing the XOR operations on the code symbol bits 1,0,0,1, with the encoded RNTI 1,1,0,0, results in 0,1,0,1, which are the same bit values as the encoded information block shown above. In this way, the encoded information block can be recovered by the XOR function 408, and sent to a decoder 410 to retrieve the information block bits. The decoder 410 can be a Reed-Muller decoder or Polar decoder, and corresponds to the decoder used at the base station device.

Figure 5:
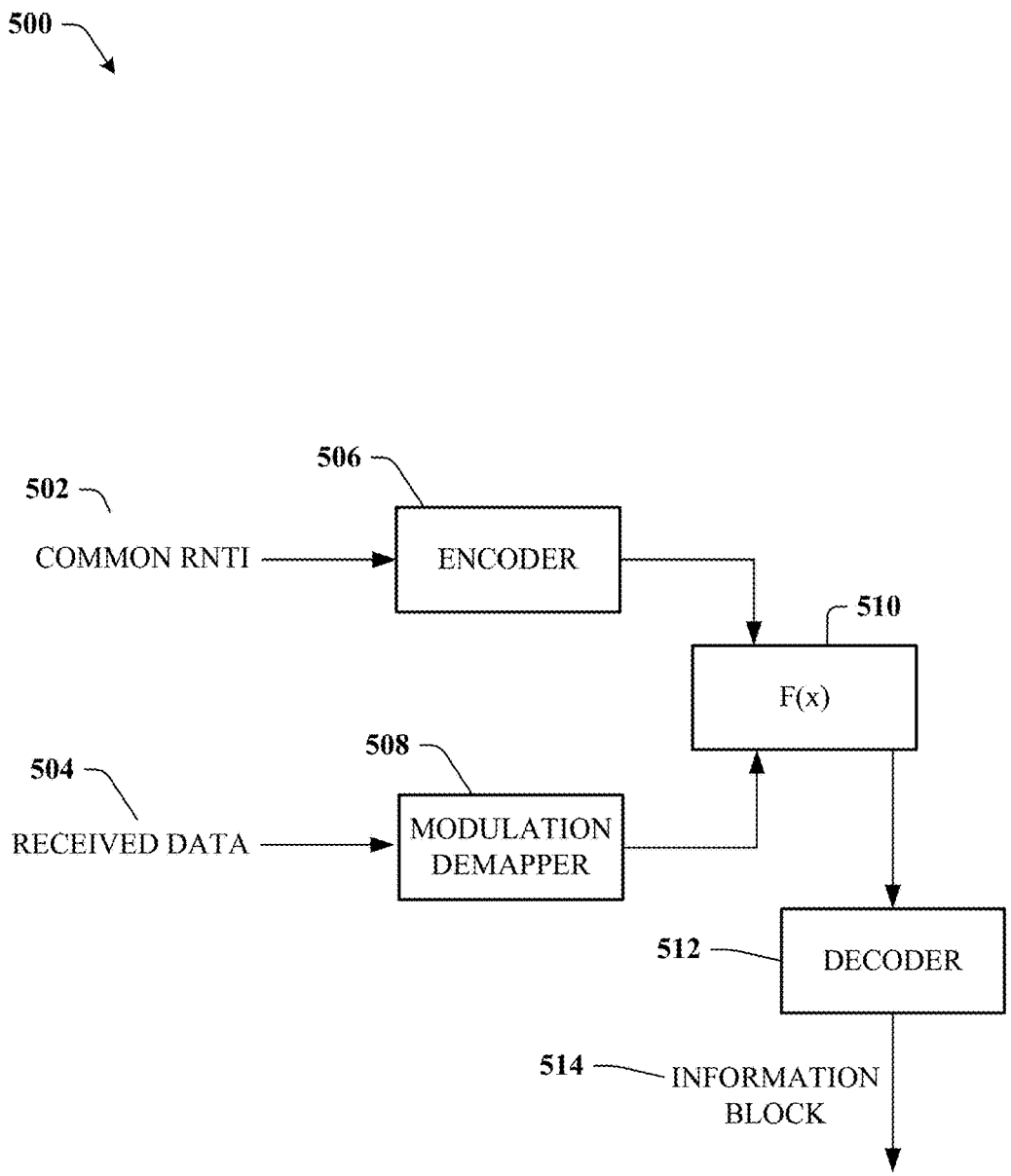
FIG. 5 illustrates an example block diagram of another decoding system for group common control channel communications in a wireless environment in accordance with various aspects and embodiments of the subject disclosure.

Turning now to FIG. 5, illustrated is an example block diagram 500 of another decoding system for group common control channel communications in a wireless environment in accordance with various aspects and embodiments of the subject disclosure. The decoding system in FIG. 5 can be used when the first encoding method in FIG. 2 is used, and can be used in conjunction or in place of the embodiment shown in FIG. 4.

The embodiment in FIG. 5 can be used when the received data 504 is in the log-likelihood ratio (LLR) domain. For instance, a modulation demapper 508 can take the received data and put the data into the LLR domain. The encoder 506 can encode the RNTI 502 and instead of a XOR function, another function of x 510 can be used to unmask the received data 504 resulting in the encoded information block that decoder 512 can decode to retrieve the information block 514.

The function F(x) can be defined as follows $$F(xi)=LLR(xi), Yj=0; F(xi)=-LLR(xi), Yj=+1$$

Where Yj is the encoded information block.

Accordingly, in this embodiment, when the received data may have been corrupted, soft decision decoding performed here using the LLR function can return a more accurate and efficient product than the hard decision decoding used by the XOR operator.

Figure 6:
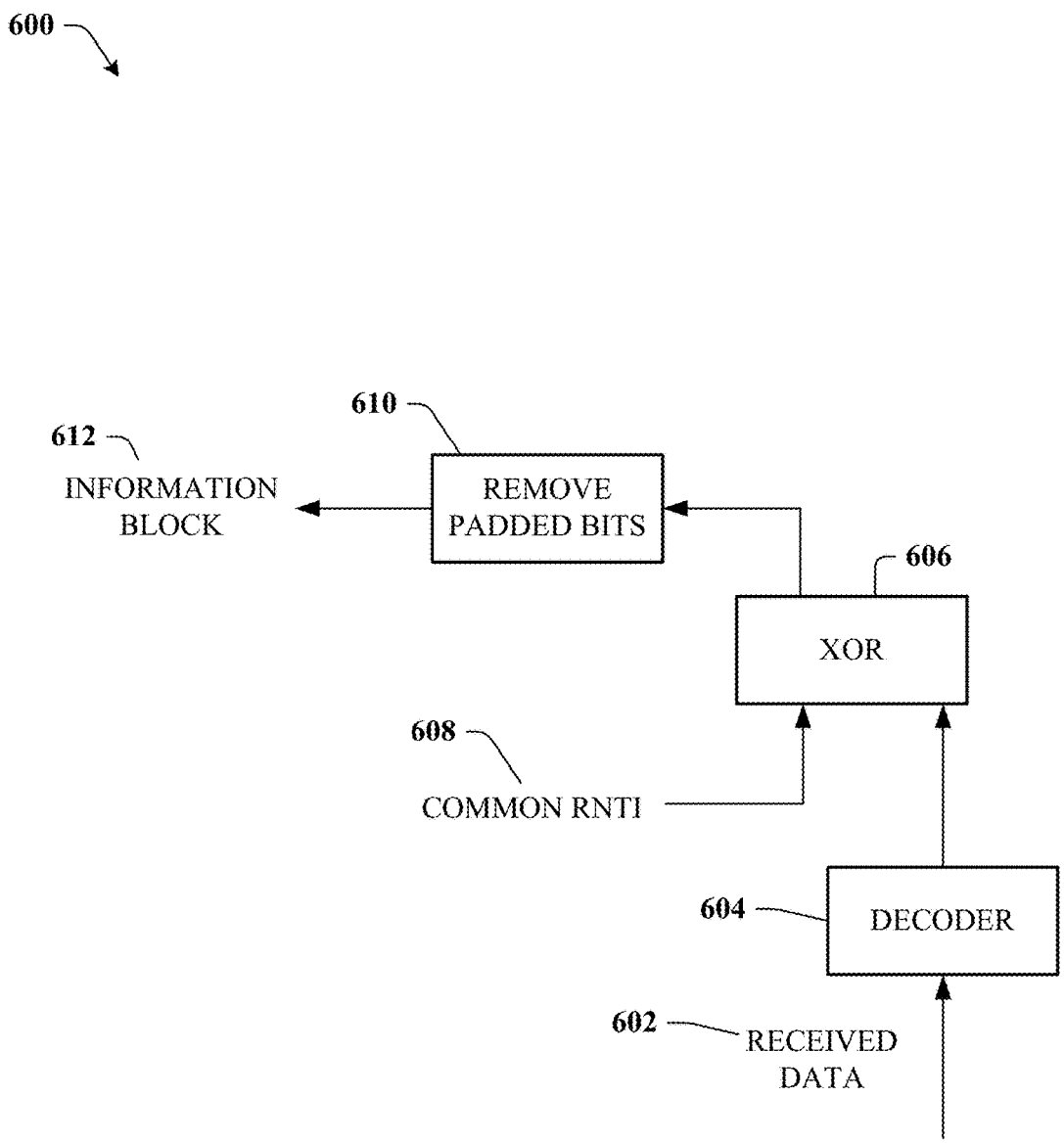
FIG. 6 illustrates an example block diagram of another decoding system for group common control channel communications in a wireless environment in accordance with various aspects and embodiments of the subject disclosure.

Turning now to FIG. 6, illustrated is an example block diagram 600 of another decoding system for group common control channel communications in a wireless environment in accordance with various aspects and embodiments of the subject disclosure. This decoder corresponds to the encoder shown in FIG. 3.

In the embodiment shown here, the received data 602 can be passed through a decoder 604 (Reed-Muller or Polar) selected based on the type used by the base station device. The decoder decodes the received data, and the decoded block is unmasked by a XOR operator 606 using the common RNTI 608. A bit remover 610 removes the padded bits from the information block, resulting in a group PDCCH information block 612.

Figure 7:
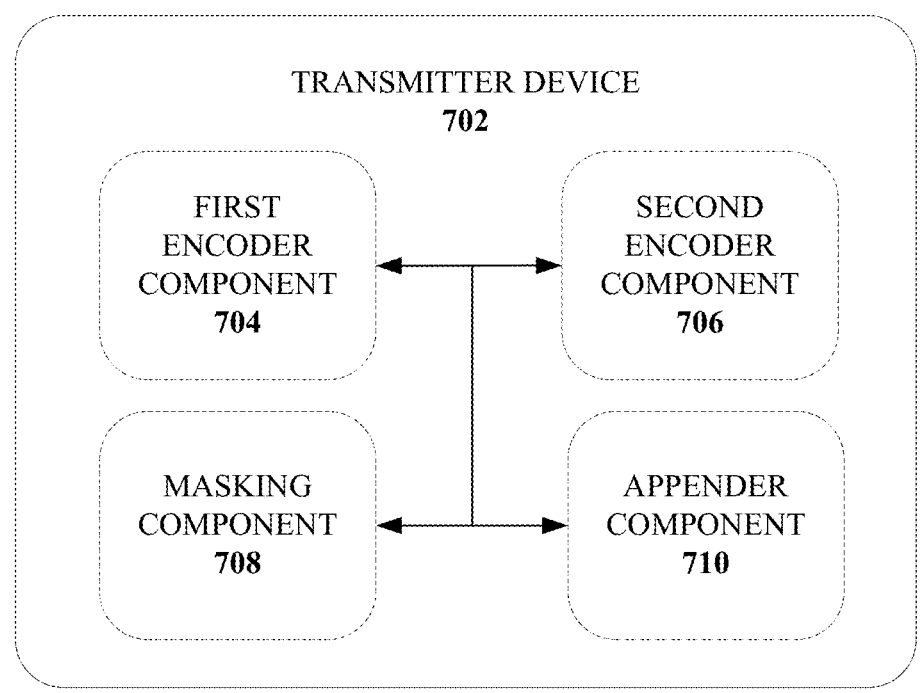
FIG. 7 illustrates an example block diagram of a transmitter system in accordance with various aspects and embodiments of the subject disclosure.

Turning now to FIG. 7, illustrated is an example block diagram 700 of a transmitter system in accordance with various aspects and embodiments of the subject disclosure.

The transmitter device 702 can include a first encoder component 704, a second encoder component 706, a masking component 708, and an appender component 710.

In an embodiment, a first encoder component 704 can receive an information block and encode the information block resulting in an encoded information block. Likewise, a second encoder component 706 can receive the common RNTI bits and encode the bits resulting in an encoded RNTI.

The masking component 708 can mask the encoded information block with the encoded RNTI, resulting in a code symbol of group PDCCH information 212 that can be transmitted to the base station device.

In an embodiment, the first encoder component 704 can be a Reed-Muller encoder or a Polar encoder. Similarly, the second encoder component 706 could also be one of a Reed-Muller encoder or a Polar encoder. Any combination of either Reed-Muller or Polar encoders can be used for the first encoder component 704 and the second encoder component 706.

In an embodiment, the information block can be 5 bits, or 8 bits or some number of bits smaller than the common RNTI which is generally 16 bits. Therefore, the code rate of the encoders can be such that the resulting encoded information block is the same size as the encoded RNTI to facilitate the masking. In an embodiment, the information block can be 5 bits, and the first encoder component 704 code rate can be 5/20, resulting in an encoded information block of 20 bits. Similarly, the code rate of the second encoder component 706 can be 16/20, resulting in a encoded RNTI of 20 bits as well. These code rates are merely exemplary, and in other embodiments, with different sized information blocks and RNTIs, and different encoders, the code rates may be different than these exemplary code rates.

In an embodiment, the masking component 708 can be a bitwise exclusive-or (XOR) function. An XOR function is a logical operation that outputs true when the inputs are different. If a portion of the bits of the encoded information block are thus 0,1,0,1 and a corresponding portion of the encoded RNTI bits are 1,1,0,0, masking the encoded information block with the encoded RNTI results in the following bits 1,0,0,1. This can be transmitted to the group of mobile devices, and the mobile devices that have the encoded RNTI bits can then unmask these bits to retrieve the encoded information block.

In a different embodiment, the appender component 710 can append bits (either padded or last bit repeated) to the information block to match the length of the common RNTI. The masking component 708 can then mask the appended information block with the common RNTI, and the result can be encoded by the first encoder component 704. The resulting code symbol can then be transmitted to the group of mobile devices over the group common control channel.

Figure 8:
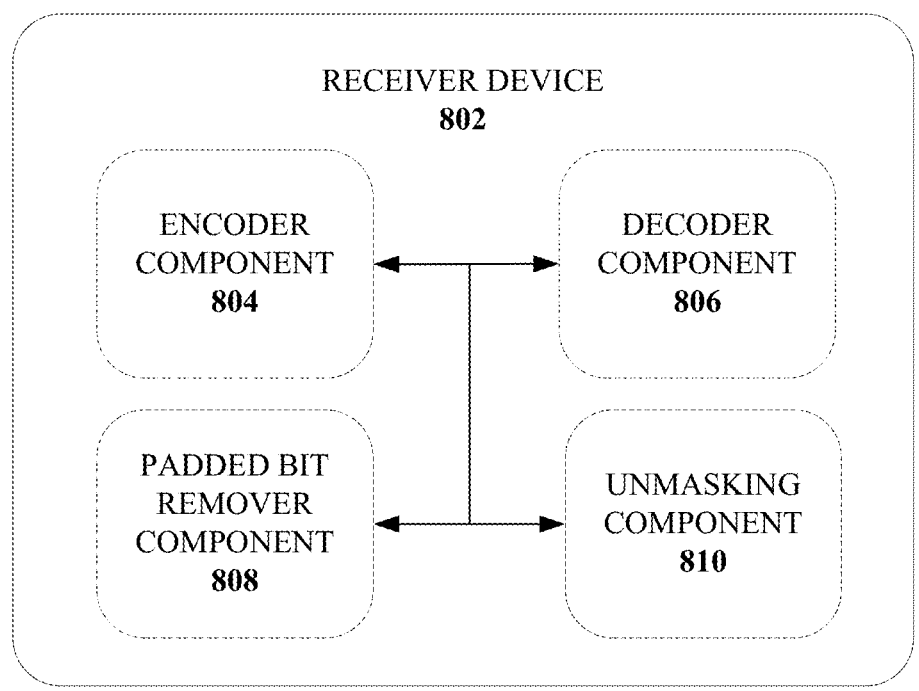
FIG. 8 illustrates an example block diagram of a receiver system in accordance with various aspects and embodiments of the subject disclosure.

Turning now to FIG. 8, illustrated is an example block diagram 800 of a receiver system in accordance with various aspects and embodiments of the subject disclosure.

In an embodiment, an encoder component 804 can encode the common RNTI and unmasking component 810 can unmask the received data (code symbol) with the encoded RNTI to determine the encoded information block. The decoder component 806 can then decode the encoded information block resulting in the information block. In an embodiment, the unmasking component 810 can be a XOR function, and in other embodiments, such as when the received data is the LLR domain the unmasking component 810 can use a function like the function in Equation 1 to unmask the information block.

In another embodiment, the decoder component 806 can first decode the received code symbol, and the unmasking component 810 can unmask the bits with the common RNTI, resulting in an information block with padded bits. The padded bit remover component 808 can then remove the padded bits from the information block to obtain the group PDCCH information.

The encoder component 804 used to encode the common RNTI, and the decoder component 806 can utilize either Reed-Muller codes or Polar codes. and should correspond to the encoder and decoder types used at the base station device.

Figure 9:
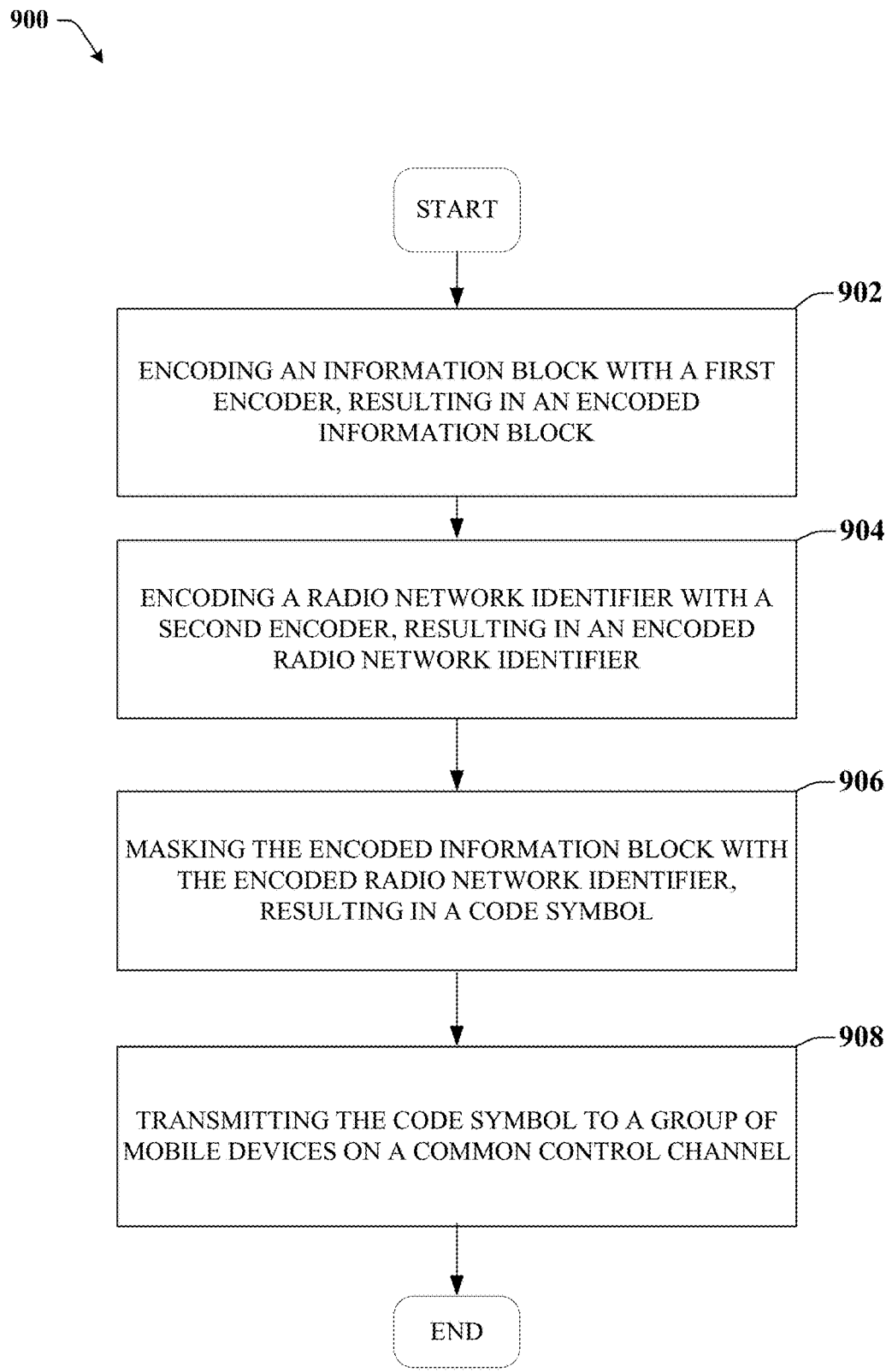
FIG. 9 illustrates an example method for encoding group common control information in accordance with various aspects and embodiments of the subject disclosure.
Figure 10:
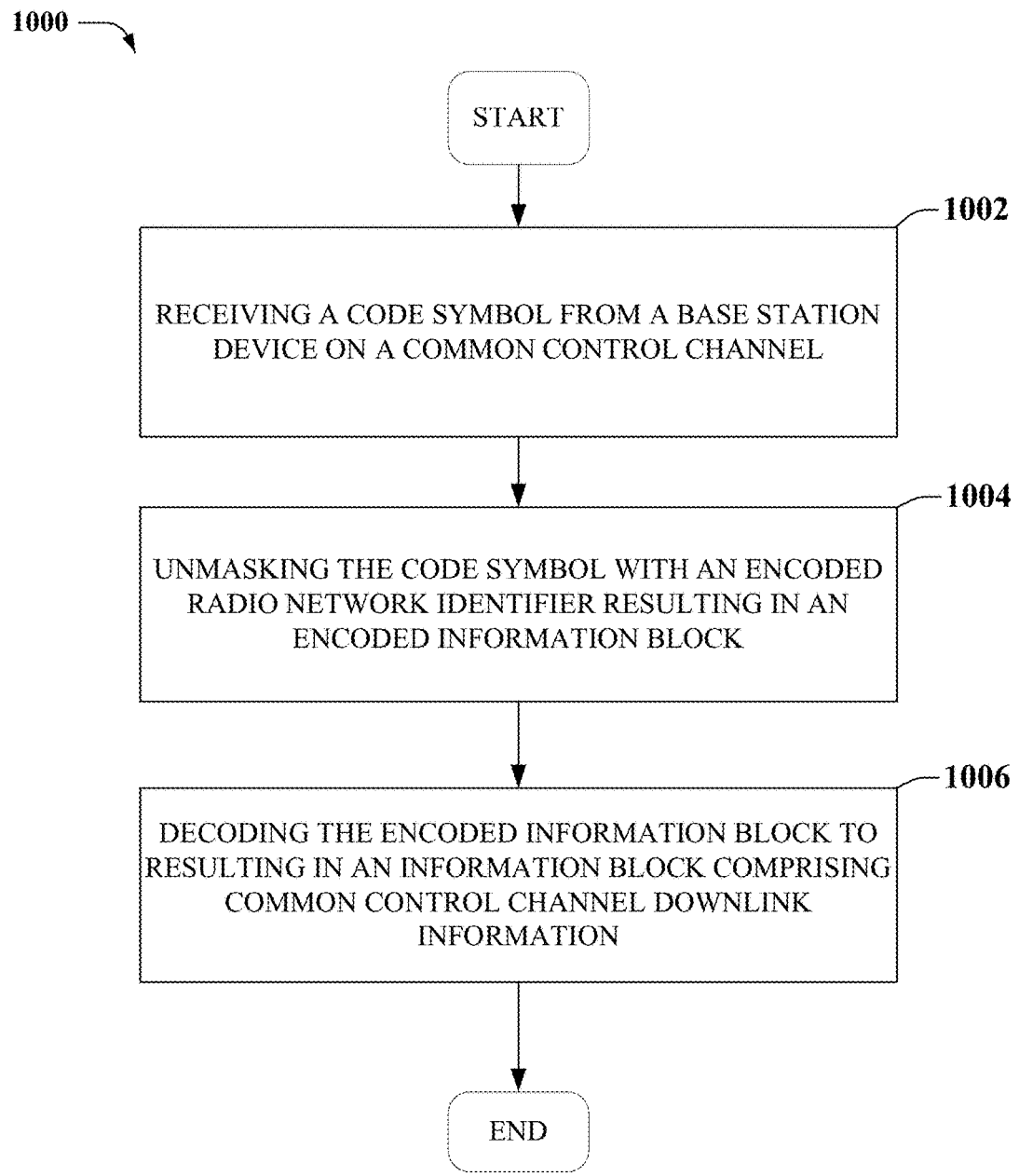
FIG. 10 illustrates an example method for decoding group common control information in accordance with various aspects and embodiments of the subject disclosure.
Figure 11:
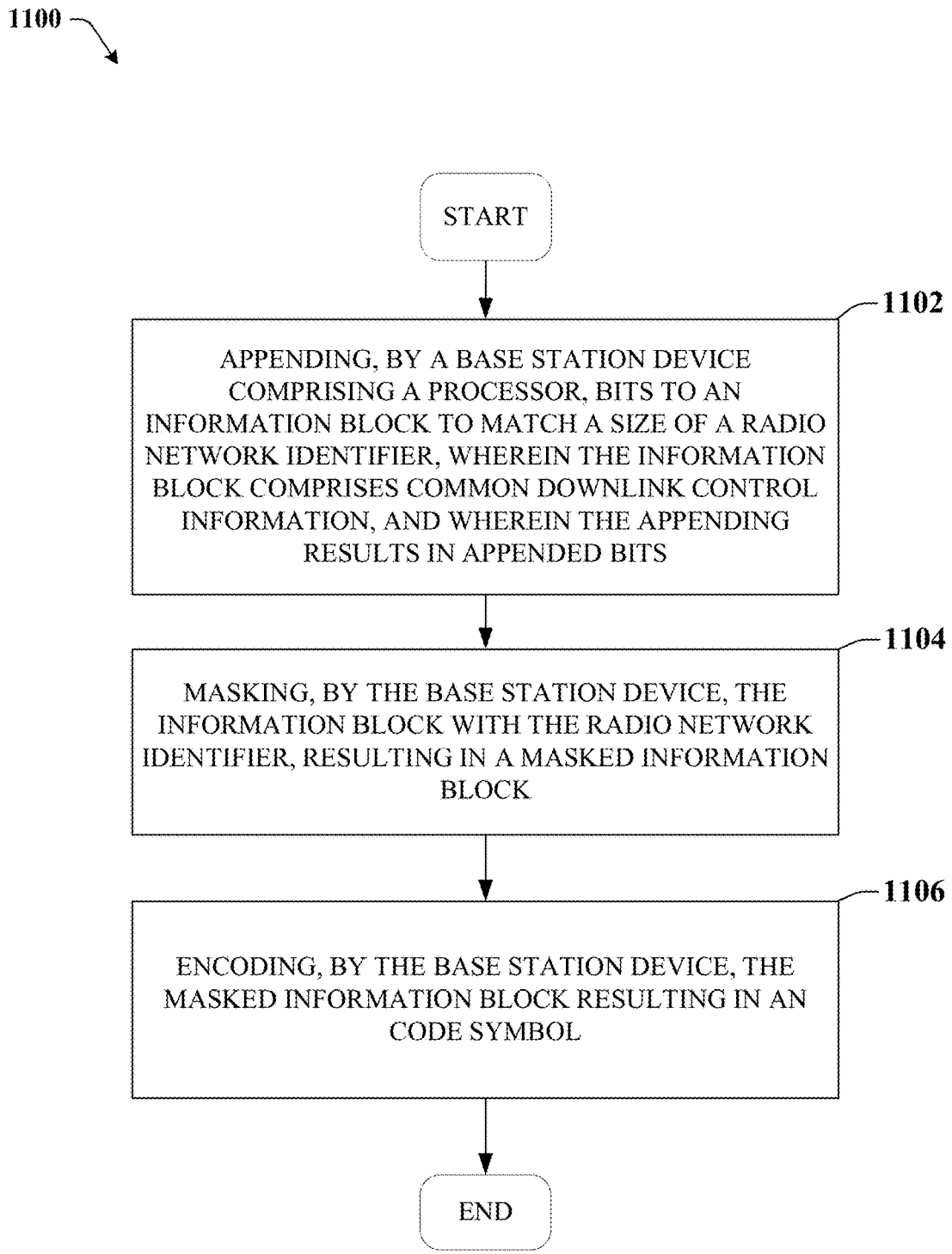
FIG. 11 illustrates another example method for encoding group common control information in accordance with various aspects and embodiments of the subject disclosure.

FIGS. 9-11 illustrates a process in connection with the aforementioned systems. The process in FIGS. 9-11 can be implemented for example by the systems in FIGS. 1-8 respectively. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

FIG. 9 illustrates an example method for encoding group common control information in accordance with various aspects and embodiments of the subject disclosure.

Method 900 can start at 902, where the method comprises encoding an information block with a first encoder, resulting in an encoded information block.

At 904 the method comprises encoding a radio network identifier with a second encoder, resulting in an encoded radio network identifier.

At 906, the method comprises masking the encoded information block with the encoded radio network identifier, resulting in a code symbol.

At 908, the method comprises decoding the encoded information block to resulting in an information block comprising common control channel downlink information.

FIG. 10 illustrates an example method for decoding group common control information in accordance with various aspects and embodiments of the subject disclosure.

Method 1000 can start at 1002, where the method comprises receiving a code symbol from a base station device on a common control channel.

At 1004 the method comprises unmasking the code symbol with an encoded radio network identifier resulting in an encoded information block.

At 1006, the method comprises decoding the encoded information block to resulting in an information block comprising common control channel downlink information.

FIG. 11 illustrates another example method for encoding group common control information in accordance with various aspects and embodiments of the subject disclosure At 1102, the method comprises appending, by a base station device comprising a processor, bits to an information block to match a size of a radio network identifier, wherein the information block comprises common downlink control information, and wherein the appending results in appended bits.

At 1104, the method comprises masking, by the base station device, the information block with the radio network identifier, resulting in a masked information block.

At 1106, the method comprises encoding, by the base station device, the masked information block resulting in an code symbol.

Figure 12:
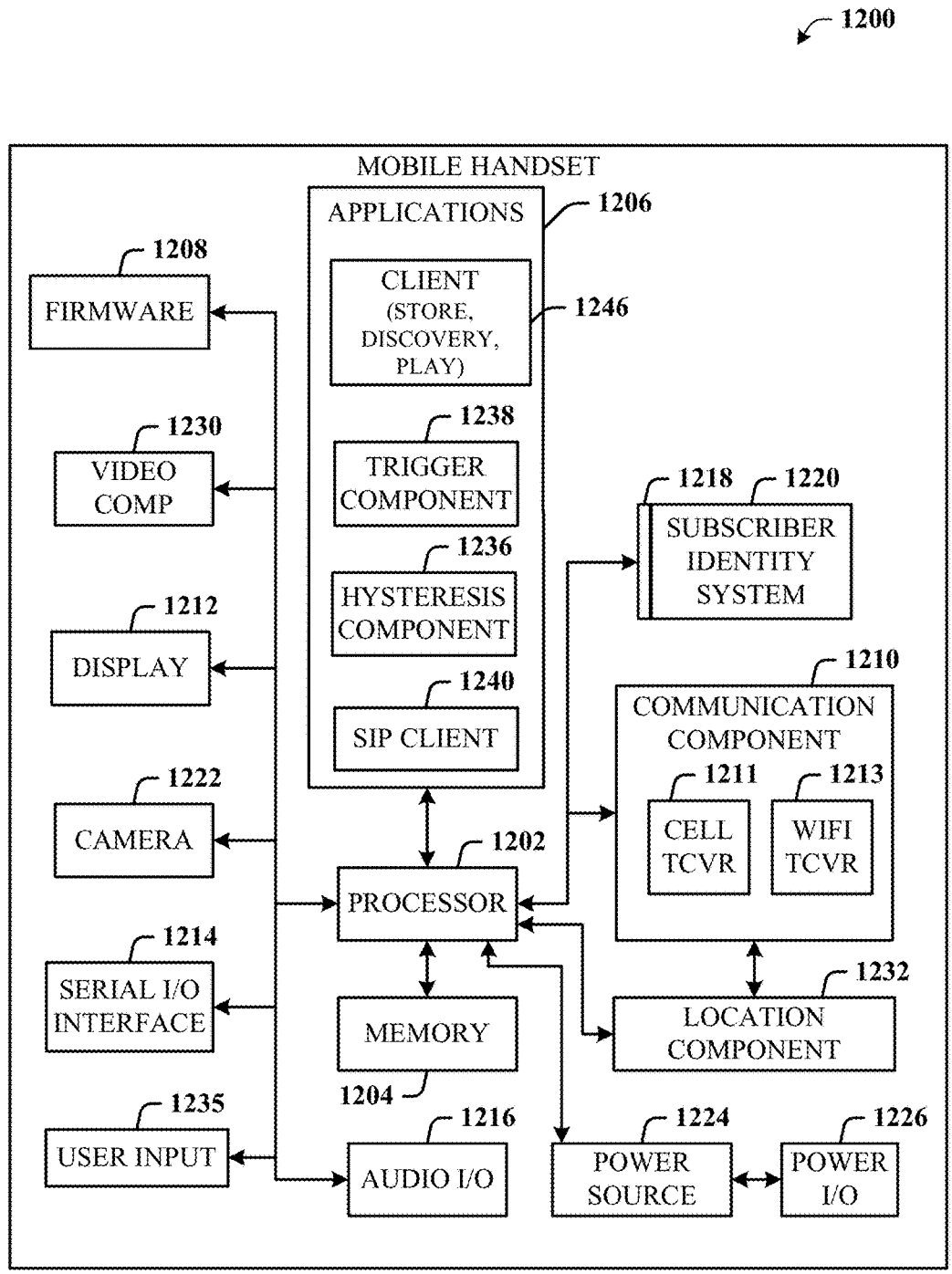
FIG. 12 illustrates an example block diagram of an example user equipment that can be a mobile handset operable to provide a format indicator in accordance with various aspects and embodiments of the subject disclosure.

Referring now to FIG. 12, illustrated is a schematic block diagram of an example end-user device such as a user equipment) that can be a mobile device 1200 capable of connecting to a network in accordance with some embodiments described herein. Although a mobile handset 1200 is illustrated herein, it will be understood that other devices can be a mobile device, and that the mobile handset 1200 is merely illustrated to provide context for the embodiments of the various embodiments described herein. The following discussion is intended to provide a brief, general description of an example of a suitable environment 1200 in which the various embodiments can be implemented. While the description includes a general context of computer-executable instructions embodied on a machine-readable storage medium, those skilled in the art will recognize that the various embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1200 includes a processor 1202 for controlling and processing all onboard operations and functions. A memory 1204 interfaces to the processor 1202 for storage of data and one or more applications 1206 (e.g., a video player software, user feedback component software, etc.). Other applications can include voice recognition of predetermined voice commands that facilitate initiation of the user feedback signals. The applications 1206 can be stored in the memory 1204 and/or in a firmware 1208, and executed by the processor 1202 from either or both the memory 1204 or/and the firmware 1208. The firmware 1208 can also store startup code for execution in initializing the handset 1200. A communications component 1210 interfaces to the processor 1202 to facilitate wired/wireless communication with external systems, e.g., cellular networks, VoIP networks, and so on. Here, the communications component 1210 can also include a suitable cellular transceiver 1211 (e.g., a GSM transceiver) and/or an unlicensed transceiver 1213 (e.g., Wi-Fi, WiMax) for corresponding signal communications. The handset 1200 can be a device such as a cellular telephone, a PDA with mobile communications capabilities, and messaging-centric devices. The communications component 1210 also facilitates communications reception from terrestrial radio networks (e.g., broadcast), digital satellite radio networks, and Internet-based radio services networks.

The handset 1200 includes a display 1212 for displaying text, images, video, telephony functions (e.g., a Caller ID function), setup functions, and for user input. For example, the display 1212 can also be referred to as a "screen" that can accommodate the presentation of multimedia content (e.g., music metadata, messages, wallpaper, graphics, etc.). The display 1212 can also display videos and can facilitate the generation, editing and sharing of video quotes. A serial I/O interface 1214 is provided in communication with the processor 1202 to facilitate wired and/or wireless serial communications (e.g., USB, and/or IEEE 1394) through a hardwire connection, and other serial input devices (e.g., a keyboard, keypad, and mouse). This supports updating and troubleshooting the handset 1200, for example. Audio capabilities are provided with an audio I/O component 1216, which can include a speaker for the output of audio signals related to, for example, indication that the user pressed the proper key or key combination to initiate the user feedback signal. The audio I/O component 1216 also facilitates the input of audio signals through a microphone to record data and/or telephony voice data, and for inputting voice signals for telephone conversations.

The handset 1200 can include a slot interface 1218 for accommodating a SIC (Subscriber Identity Component) in the form factor of a card Subscriber Identity Module (SIM) or universal SIM 1220, and interfacing the SIM card 1220 with the processor 1202. However, it is to be appreciated that the SIM card 1220 can be manufactured into the handset 1200, and updated by downloading data and software.

The handset 1200 can process IP data traffic through the communication component 1210 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 1222 (e.g., a camera) can be provided for decoding encoded multimedia content. The video processing component 1222 can aid in facilitating the generation, editing and sharing of video quotes. The handset 1200 also includes a power source 1224 in the form of batteries and/or an AC power subsystem, which power source 1224 can interface to an external power system or charging equipment (not shown) by a power I/O component 1226.

The handset 1200 can also include a video component 1230 for processing video content received and, for recording and transmitting video content. For example, the video component 1230 can facilitate the generation, editing and sharing of video quotes. A location tracking component 1232 facilitates geographically locating the handset 1200. As described hereinabove, this can occur when the user initiates the feedback signal automatically or manually. A user input component 1234 facilitates the user initiating the quality feedback signal. The user input component 1234 can also facilitate the generation, editing and sharing of video quotes. The user input component 1234 can include such conventional input device technologies such as a keypad, keyboard, mouse, stylus pen, and/or touch screen, for example.

Referring again to the applications 1206, a hysteresis component 1236 facilitates the analysis and processing of hysteresis data, which is utilized to determine when to associate with the access point. A software trigger component 1238 can be provided that facilitates triggering of the hysteresis component 1238 when the Wi-Fi transceiver 1213 detects the beacon of the access point. A SIP client 1240 enables the handset 1200 to support SIP protocols and register the subscriber with the SIP registrar server. The applications 1206 can also include a client 1242 that provides at least the capability of discovery, play and store of multimedia content, for example, music.

The handset 1200, as indicated above related to the communications component 810, includes an indoor network radio transceiver 1213 (e.g., Wi-Fi transceiver). This function supports the indoor radio link, such as IEEE 802.11, for the dual-mode GSM handset 1200. The handset 1200 can accommodate at least satellite radio services through a handset that can combine wireless voice and digital radio chipsets into a single handheld device.

Figure 13:
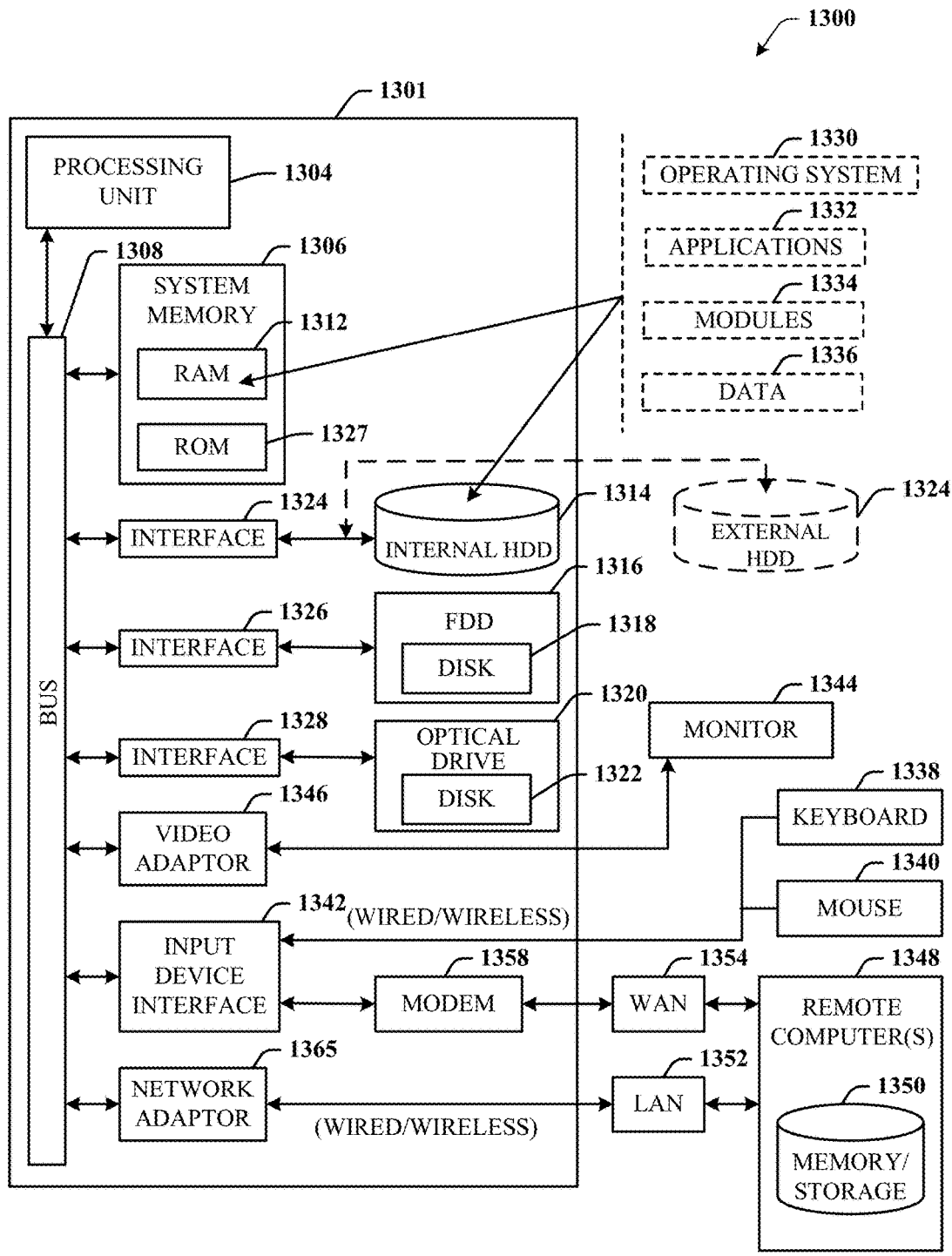
FIG. 13 illustrates an example block diagram of a computer that can be operable to execute processes and methods in accordance with various aspects and embodiments of the subject disclosure.

Referring now to FIG. 13, there is illustrated a block diagram of a computer 1300 operable to execute the functions and operations performed in the described example embodiments. For example, a network node (e.g., network node 406) may contain components as described in FIG. 13. The computer 1300 can provide networking and communication capabilities between a wired or wireless communication network and a server and/or communication device. In order to provide additional context for various aspects thereof, FIG. 13 and the following discussion are intended to provide a brief, general description of a suitable computing environment in which the various aspects of the embodiments can be implemented to facilitate the establishment of a transaction between an entity and a third party. While the description above is in the general context of computer-executable instructions that can run on one or more computers, those skilled in the art will recognize that the various embodiments also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the various embodiments can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 13, implementing various aspects described herein with regards to the end-user device can include a computer 1300, the computer 1300 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multi-processor architectures can also be employed as the processing unit 1304.

The system bus 1308 can be any of several types of bus structure that can further interconnect to a memory bus (with or without a memory controller), a peripheral bus, and a local bus using any of a variety of commercially available bus architectures. The system memory 1306 includes read-only memory (ROM) 1327 and random access memory (RAM) 1312. A basic input/output system (BIOS) is stored in a non-volatile memory 1327 such as ROM, EPROM, EEPROM, which BIOS contains the basic routines that help to transfer information between elements within the computer 1300, such as during start-up. The RAM 1312 can also include a high-speed RAM such as static RAM for caching data.

The computer 1300 further includes an internal hard disk drive (HDD) 1314 (e.g., EIDE, SATA), which internal hard disk drive 1314 can also be configured for external use in a suitable chassis (not shown), a magnetic floppy disk drive (FDD) 1316, (e.g., to read from or write to a removable diskette 1318) and an optical disk drive 1320, (e.g., reading a CD-ROM disk 1322 or, to read from or write to other high capacity optical media such as the DVD). The hard disk drive 1314, magnetic disk drive 1316 and optical disk drive 1320 can be connected to the system bus 1308 by a hard disk drive interface 1324, a magnetic disk drive interface 1326 and an optical drive interface 1328, respectively. The interface 1324 for external drive implementations includes at least one or both of Universal Serial Bus (USB) and IEEE 1294 interface technologies. Other external drive connection technologies are within contemplation of the subject embodiments.

The drives and their associated computer-readable media provide nonvolatile storage of data, data structures, computer-executable instructions, and so forth. For the computer 1300 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1300, such as zip drives, magnetic cassettes, flash memory cards, cartridges, and the like, can also be used in the example operating environment, and further, that any such media can contain computer-executable instructions for performing the methods of the disclosed embodiments.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. It is to be appreciated that the various embodiments can be implemented with various commercially available operating systems or combinations of operating systems.

A user can enter commands and information into the computer 1300 through one or more wired/wireless input devices, e.g., a keyboard 1338 and a pointing device, such as a mouse 1340. Other input devices (not shown) may include a microphone, an IR remote control, a joystick, a game pad, a stylus pen, touch screen, or the like. These and other input devices are often connected to the processing unit 1304 through an input device interface 1342 that is coupled to the system bus 1308, but can be connected by other interfaces, such as a parallel port, an IEEE 1394 serial port, a game port, a USB port, an IR interface, etc.

A monitor 1344 or other type of display device is also connected to the system bus 1308 through an interface, such as a video adapter 1346. In addition to the monitor 1344, a computer 1300 typically includes other peripheral output devices (not shown), such as speakers, printers, etc.

The computer 1300 can operate in a networked environment using logical connections by wired and/or wireless communications to one or more remote computers, such as a remote computer(s) 1348. The remote computer(s) 1348 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1350 is illustrated. The logical connections depicted include wired/wireless connectivity to a local area network (LAN) 1352 and/or larger networks, e.g., a wide area network (WAN) 1354. Such LAN and WAN networking environments are commonplace in offices and companies, and facilitate enterprise-wide computer networks, such as intranets, all of which may connect to a global communications network, e.g., the Internet.

When used in a LAN networking environment, the computer 1300 is connected to the local network 1352 through a wired and/or wireless communication network interface or adapter 1356. The adapter 1356 may facilitate wired or wireless communication to the LAN 1352, which may also include a wireless access point disposed thereon for communicating with the wireless adapter 1356.

When used in a WAN networking environment, the computer 1300 can include a modem 1358, or is connected to a communications server on the WAN 1354, or has other means for establishing communications over the WAN 1354, such as by way of the Internet. The modem 1358, which can be internal or external and a wired or wireless device, is connected to the system bus 1308 through the input device interface 1342. In a networked environment, program modules depicted relative to the computer, or portions thereof, can be stored in the remote memory/storage device 1350. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11b) or 54 Mbps (802.11a) data rate, for example, or with products that contain both bands (dual band), so the networks can provide real-world performance similar to the basic "10BaseT" wired Ethernet networks used in many offices.

As used in this application, the terms "system," "component," "interface," and the like are generally intended to refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. These components also can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry that is operated by software or firmware application(s) executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. An interface can comprise input/output (I/O) components as well as associated processor, application, and/or API components.

Furthermore, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory. In addition, memory components or memory elements can be removable or stationary. Moreover, memory can be internal or external to a device or component, or removable or stationary. Memory can comprise various types of media that are readable by a computer, such as hard-disc drives, zip drives, magnetic cassettes, flash memory cards or other types of memory cards, cartridges, or the like.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments comprises a system as well as a computer-readable medium having computer-executable instructions for performing the acts and/or events of the various methods.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communications media comprise wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any datastream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. A method, comprising:

appending, by a base station device comprising a processor, bits to an information block to match a size of a radio network identifier, wherein the information block comprises common downlink control information, and wherein the appending results in appended bits;

masking, by the base station device, the information block with the radio network identifier, resulting in a masked information block;

encoding, by the base station device, the masked information block resulting in a code symbol;

transmitting, by the base station device, the radio network identifier to a group of mobile devices using a radio resource control channel before a common control channel is established; and transmitting, by the base station device, the code symbol to the group of mobile devices on the common control channel.

2. The method of claim 1, wherein the encoding comprises Reed-Muller encoding.

3. The method of claim 1, wherein the encoding comprises polar encoding.

4. The method of claim 1, wherein the appended bits are null bits.

5. The method of claim 1, wherein the appended bits are repeated bits of a last bit of the common downlink control information.

6. The method of claim 1, wherein the masking the information block with the radio network identifier comprises performing a bitwise exclusive-or operation with respect to the information block and the radio network identifier.

7. The method of claim 1, wherein the code symbol is in a log-likelihood ratio domain.

8. The method of claim 1, further comprising determining, by the base station device, the size of the radio network identifier.

9. The method of claim 1, wherein the appended bits are null bits.

10. A transmitter device, comprising:

a processor; and a memory that stores executable instructions that, when executed by the processor, facilitate performance of operations, comprising:

adding bits to an information block resulting in the information block being a same size as a radio network identifier, and wherein the adding results in added bits;

masking the information block and the added bits with the radio network identifier, resulting in a masked information block;

encoding the masked information resulting in a code symbol;

transmitting the radio network identifier to a group of mobile devices using a radio resource control channel before a common control channel has been established; and transmitting the code symbol to the group of mobile devices via the common control channel.

11. The transmitter device of claim 10, wherein the added bits are repeated bits of a last bit of common downlink control information.

12. The transmitter device of claim 10, wherein the added bits are null bits.

13. The transmitter device of claim 10 wherein the masking the information block with the radio network identifier comprises performing a bitwise exclusive-or operation with respect to the information block and the radio network identifier.

14. The transmitter device of claim 10, wherein the encoding is Reed-Muller encoding.

15. The transmitter device of claim 10, wherein the encoding is polar encoding.

16. The transmitter device of claim 10, the operations further comprising determining a size of the radio network identifier.

17. The transmitter device of claim 10, wherein the added bits are repeated bits of the last bit of the information block.

18. A non-transitory machine-readable storage medium, comprising executable instructions that, when executed by a processor of a device, facilitate performance of operations, comprising:

adding bits to an information block such that the information block is a same size as a radio network identifier, and wherein the adding results in added bits;

masking the information block and the added bits with the radio network identifier, resulting in a masked information block;

encoding the masked information resulting in a code symbol;

transmitting the radio network identifier to a group of mobile devices using a radio resource control channel before a common control channel is established; and transmitting the code symbol to the group of mobile devices on the common control channel.

19. The non-transitory machine-readable storage medium of claim 18, wherein the masking the information block with the radio network identifier comprises performing a bitwise exclusive-or operation with respect to the information block and the radio network identifier.

20. The non-transitory machine-readable storage medium of claim 18, the operations further comprising determining a size of the radio network identifier.

* * * * *